(12) United States Patent
Norimoto et al.

(10) Patent No.: US 7,146,964 B2
(45) Date of Patent: Dec. 12, 2006

(54) ENGINE CONTROL SYSTEM

(75) Inventors: Sumiko Norimoto, Kobe (JP); Hiroshi Haraguchi, Kariya (JP); Akira Umehara, Kariya (JP); Eiji Takemoto, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/281,742

(22) Filed: Nov. 18, 2005

(65) Prior Publication Data

US 2006/0102147 A1 May 18, 2006

(30) Foreign Application Priority Data

Nov. 18, 2004 (JP) ............... 2004-334811

(51) Int. Cl.
*F02D 41/40* (2006.01)
(52) U.S. Cl. .................... 123/435; 123/501
(58) Field of Classification Search ........... 123/435, 123/501, 502, 564, 568.21; 60/602
See application file for complete search history.

(56) References Cited

U.S. PATENT DOCUMENTS 6,994,077 B1 * 2/2006 Kobayashi et al. .... 123/568.11
2003/0196635 A1 * 10/2003 Kataoka et al. ........ 123/568.21
2005/0090966 A1 * 4/2005 Strom et al. ................ 701/109
2005/0188955 A1 * 9/2005 Koopmans .................. 123/435

FOREIGN PATENT DOCUMENTS

| EP | 1 538 325 A1 | 6/2005 |
| JP | 2000-240497 | 9/2000 |
| JP | 2004-100567 | 4/2004 |

* cited by examiner

Primary Examiner—T. M. Argenbright
(74) Attorney, Agent, or Firm—Nixon & Vanderhye P.C.

(57) ABSTRACT

When a combustion mode of an engine is a diffuse combustion mode in which an initial rising inclination of a heat-release-rate is steep, an electronic control unit (ECU) calculates an ignition timing in which the heat-release-rate exceeds an ignition determining value. Thus, even if a cylinder pressure sensor has a gain deviation or an offset deviation, the ignition timing is accurately detected to control the injection start timing. When the combustion mode is a premix combustion mode in which the initial rising inclination of the heat-release-rate is moderate, a peak arising timing of the heat-release-rate is calculated. Thus, the peak arising timing is accurately detected to control the injection start timing.

8 Claims, 13 Drawing Sheets

ENGINE CONTROL SYSTEM

CROSS REFERENCE TO RELATED APPLICATIONS

This application is based on Japanese Patent Application No. 2004-334811 filed on Nov. 18, 2004, the disclosure of which is incorporated herein by reference.

FIELD OF THE INVENTION

The present invention relates to an engine control system which performs a feedback control on a control subject relating to an engine control based on a pressure in a combustion chamber of the engine. The pressure in the combustion chamber is detected by a cylinder pressure sensor. The control subject is such as a fuel injection timing, a fuel injection amount, a valve opening of an EGR apparatus, and a turbo opening of a turbocharger. Especially, the present invention relates to the engine control system which is able to change combustion mode which varies in an initial rising inclination character of a heat-release-rate.

BACKGROUND OF THE INVENTION

JP-2004-100567A (EP-1538325A1) shows that the ignition timing is detected by a cylinder pressure sensor and a feedback control of the control subject is performed based on the detected ignition timing. More specifically, the heat-release-rate is calculated based on output signals from the cylinder pressure sensor, and then the ignition timing in which the heat-release-rate exceeds a predetermined value is derived. Such a method for detecting the ignition timing is suitable for a combustion mode in which the initial rising inclination is steep. This combustion mode, for example diesel combustion, is referred to as a diffuse combustion.

Figure 11A:
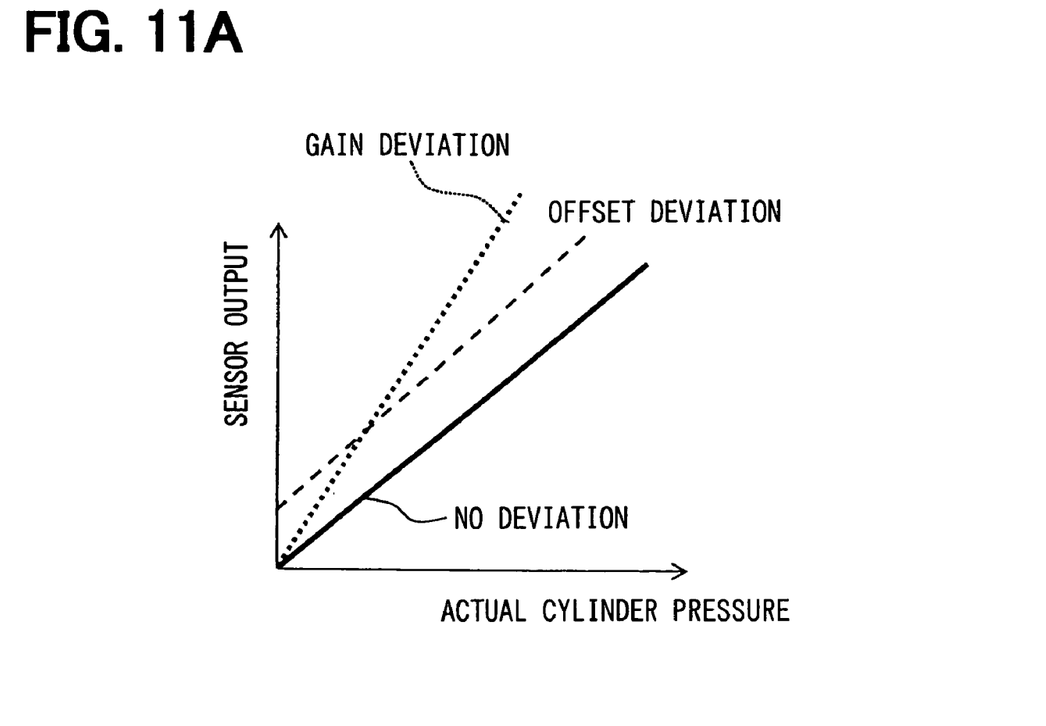
FIGS. 11A and 11B are graphs showing an output characteristic of a cylinder pressure sensor and a variation of a cylinder pressure.

The cylinder pressure sensor requires a target output characteristic which is shown by a solid line in FIG. 11A. However, due to sensor errors, a gain deviation may be arose as shown by a short dashed line, or an offset deviation may be arose as shown by a long dashed line in FIG. 11A.

Figure 11B:
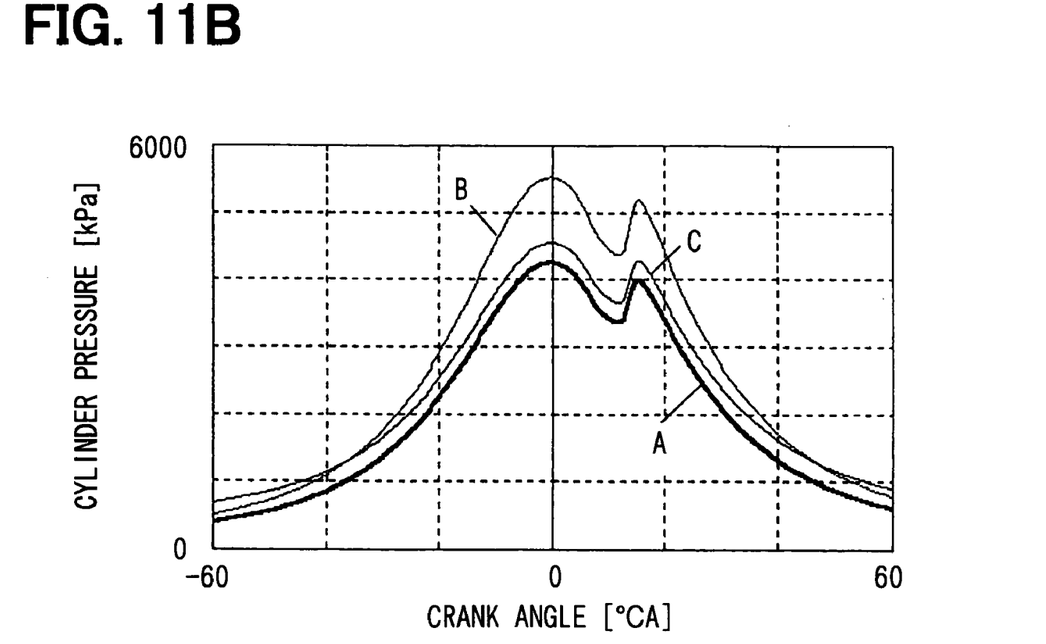

When the gain deviation or the offset deviation is arose, the cylinder pressure calculated based on the cylinder pressure sensor output deviates from the actual cylinder pressure as shown in FIG. 11B. A heavy line "A" indicates the actual cylinder pressure, a thin line "B" indicates a calculated cylinder pressure having the gain deviation, the other thin line "C" indicates a calculated cylinder pressure having the offset deviation.

Since the above method for detecting the ignition timing is used for the diffuse combustion in which the initial rising inclination of the heat-release-rate is steep, even when the gain deviation or the offset deviation in output characteristic of the cylinder pressure sensor is arose as shown in FIGS. 12A to 12C and 13A to 13B, a fluctuation of timing in which the heat-release-rate reaches the ignition determination timing is relatively small. Thus, detecting error of the ignition timing is small to accurately detect the ignition timing.

Figure 12A:
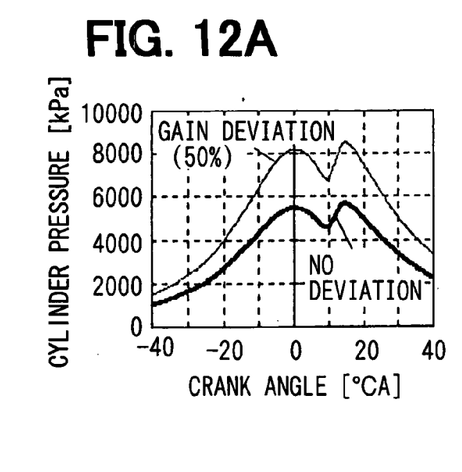
FIGS. 12A to 12F are graphs showing a detection error of an ignition timing due to a gain deviation.
Figure 12B:
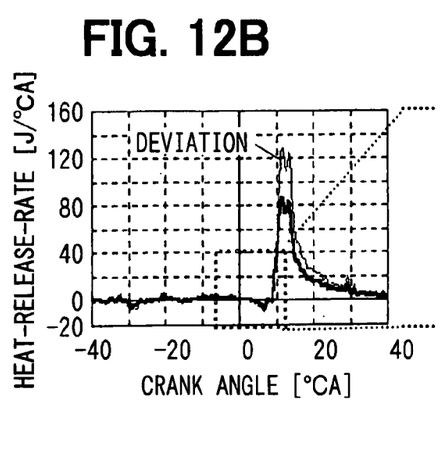
Figure 12C:
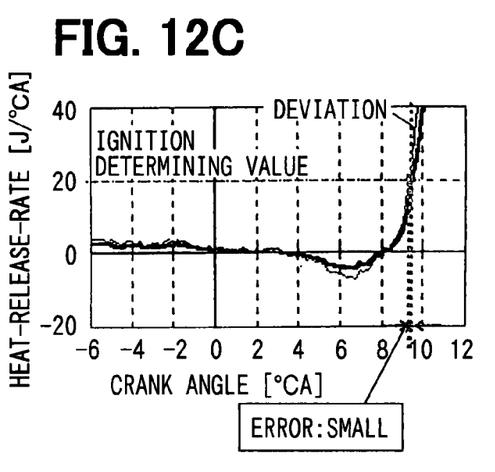
Figure 13A:
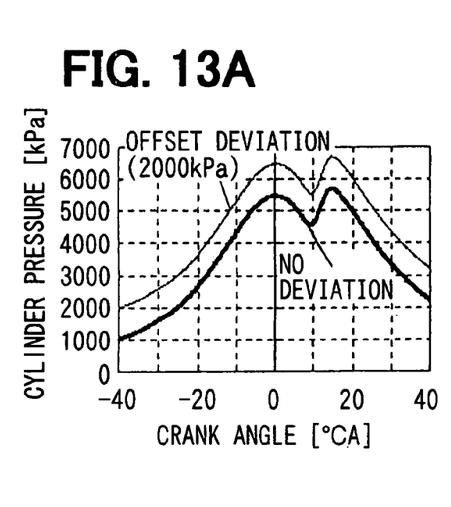
FIGS. 13A to 13F are graphs showing a detection error of an ignition timing due to an offset deviation.
Figure 13B:
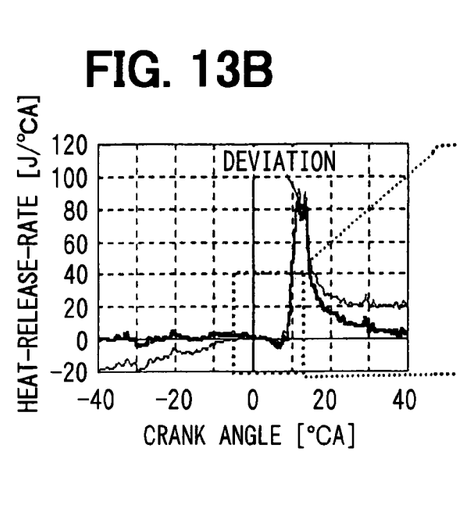
Figure 13C:
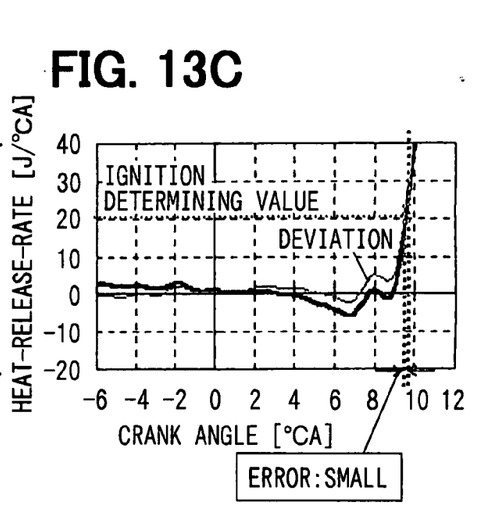

In FIGS. 12A to 12C, heavy lines indicate the gain deviation exists, and thin lines indicate no gain deviation exists. In FIGS. 13A to 13C, heavy lines indicate the offset deviation exists, and thin lines indicate no offset deviation exists.

Figure 12D:
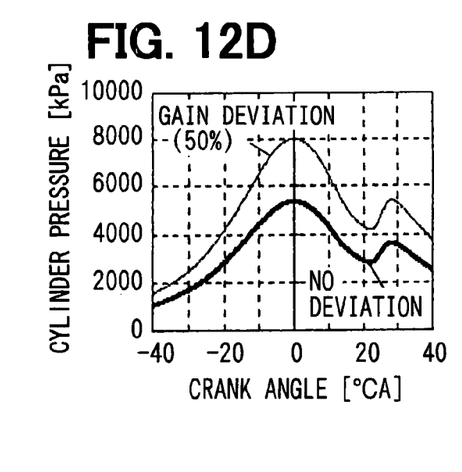
Figure 12E:
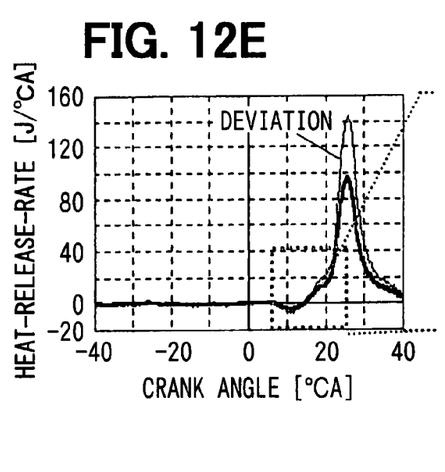
Figure 12F:
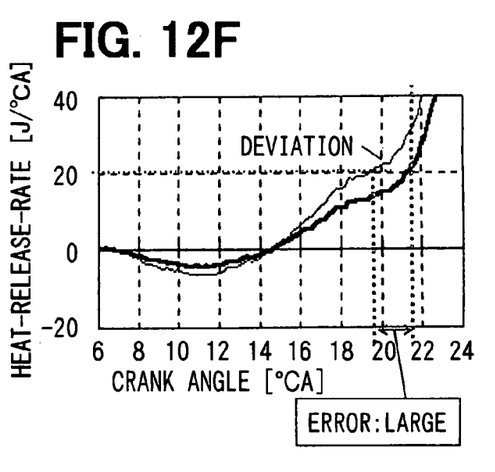
Figure 13D:
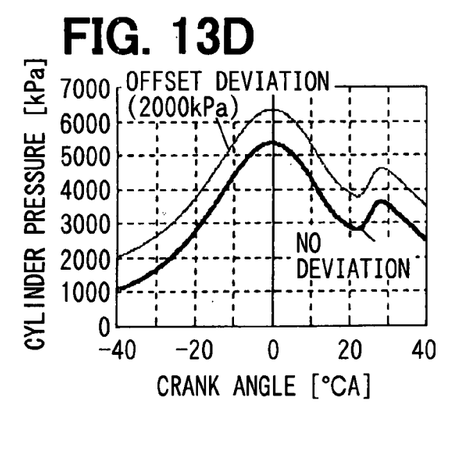
Figure 13E:
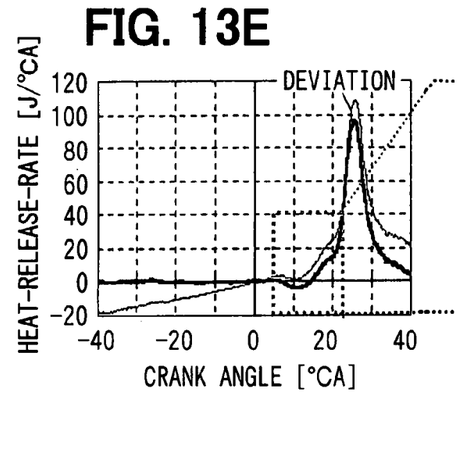
Figure 13F:
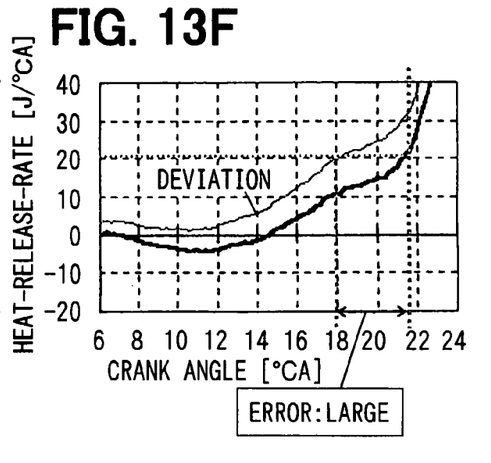

On the other hand, combustions in engines include not only the diffuse combustion but also a premix combustion such as Homogeneous-Charge Compression-ignition combustion in which the initial rising inclination of the heat-release-rate is gentle. When the method for detecting the ignition timing is applied to the premix combustion, the following problem will arise. That is, when the gain deviation or the offset deviation is arose as shown in FIGS. 12D to 12F and FIGS. 13D to 13F, a fluctuation of timing in which the heat-release-rate reaches the ignition determination timing becomes large. Thus, the detecting error of the ignition timing becomes large. In FIGS. 12D to 12F, heavy lines indicate the gain deviation exists, and thin lines indicate no gain deviation exists. In FIGS. 13D to 13F, heavy lines indicate the offset deviation exists, and thin lines indicate no offset deviation exists.

SUMMARY OF THE INVENTION

The present invention is made in view of the foregoing matter and it is an object of the present invention to provide an engine control system which performs a feedback control on a control subject relating to an engine control based on information about an ignition timing which is precisely detected by a cylinder pressure sensor irrespective of the combustion mode of which initial rising inclination of the heat-release-rate may be varied.

According to an engine control system of the present invention, the engine controls system comprises a cylinder pressure senor detecting pressure in a combustion chamber of an engine; and an electronic control unit feedback-controlling a control subject which relates to an engine control based on a detected value by the cylinder pressure sensor.

The electronic control unit includes a heat-release-rate calculation means for calculating a heat-release-rate in the combustion chamber of the engine based on an output signal from the cylinder pressure sensor, and a combustion mode determining means for determining whether a combustion mode of the engine is a first combustion mode or a second combustion mode in which a initial rising inclination of the heat-release-rate relative to a time axis or a crank angle is more moderate than that in the first combustion mode.

When the combustion mode is the first combustion mode, a first feedback control means is activated to derive an ignition timing in which the calculated heat-release-rate exceeds a predetermined ignition determining value, and then the first feedback control means feedback-controls the control subject based on the ignition timing.

When the combustion mode is the second combustion mode, a second feedback control means is activated to derive a peak arising timing of the calculated heat-release-rate, and then the second feedback control means feedback-controls the control subject based on the peak arising timing.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

An embodiment of the present invention will be described hereinafter with reference to the drawings.

[First Embodiment]

Figure 1:
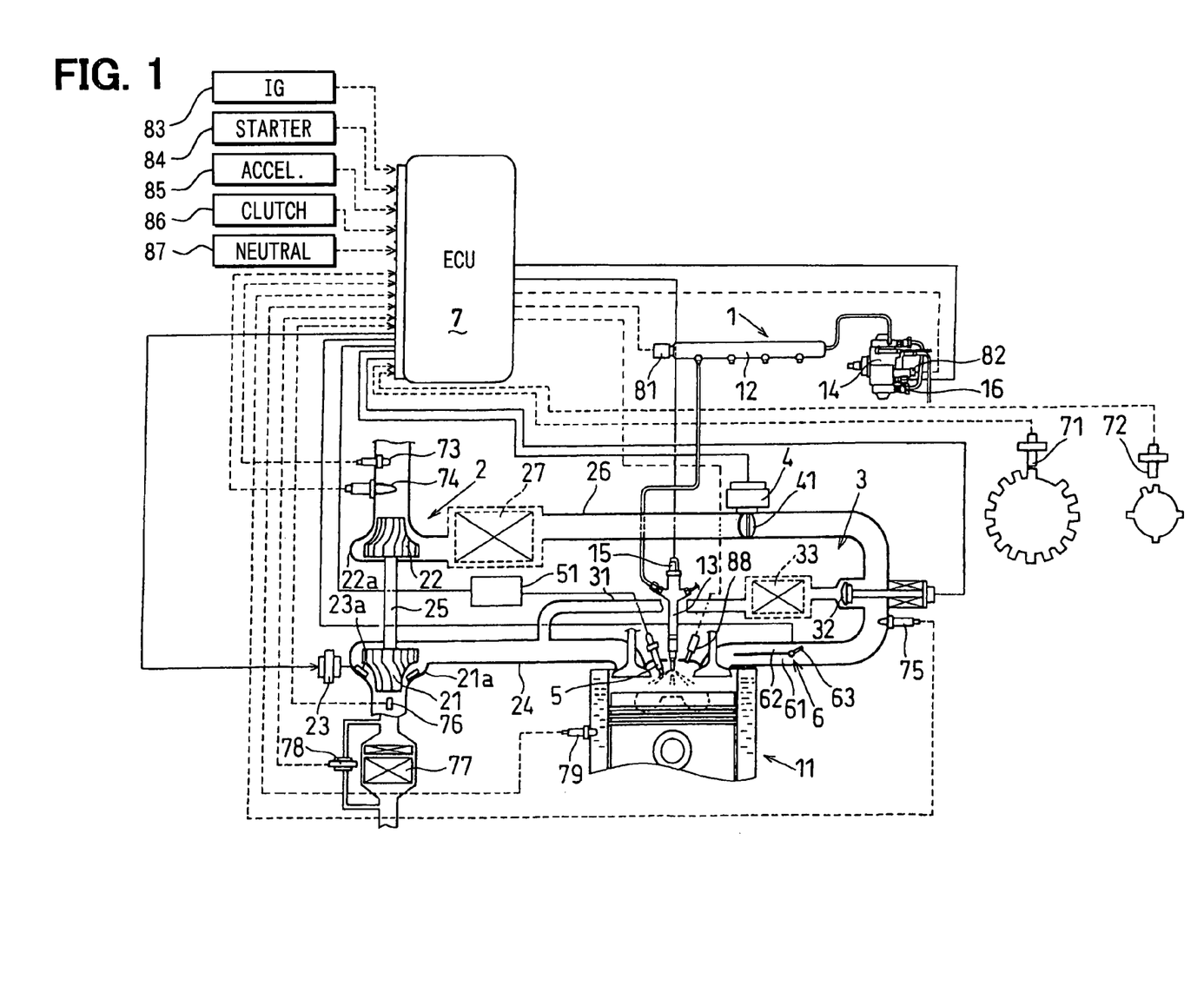
FIG. 1 is a schematic view showing an engine control system.

FIG. 1 is a schematic view of an engine control system. The engine control system includes a plurality of control subjects and an electric control unit (ECU) 7 which controls the control subjects. The control subjects comprises a common-rail fuel injection apparatus 1, a super charger 2, an EGR (Exhaust Gas Recirculation) apparatus 3, an intake throttle 4, a glow plug 5, and a swirl control apparatus 6. In this first embodiment, the ECU 7 controls the common-rail fuel injection apparatus 1.

The common-rail apparatus 1 supplies fuel to a diesel engine, which is referred to as an engine, and comprises a common-rail 12, an injector 13, a supply pump 14, and the like.

An outlet of the supply pump 14 is connected to the common-rail 12 which accumulates the fuel in a high pressure. Each of the injector 13 is fluidly connected to the common-rail 12 through a supply pipe.

Each of the injector 13 is respectively mounted to each cylinder of the engine 11. The injector 13 includes a fuel injection nozzle (not shown) and an electromagnetic valve 15. When the electromagnetic valve 15 is energized, the injector 13 injects the fuel into the cylinder.

The supply pump 14 is a fuel pump which supplies the pressurized fuel into the common-rail 12, and includes a feed pump (not shown) which sucks the fuel in a fuel tank and a pressurizing pump (not shown) which pressurize the fuel and introduce the fuel into the common-rail 12. The feed pump and the pressurizing pump are driven by a common camshaft (not shown) which is driven by the engine 11.

The supply pump includes a suction control valve (SCV) 16 which adjusts the amount of fuel which is introduced into the pressurizing pump. That is, the suction control valve 16 adjusts the pressure in the common-rail.

The supercharger 2 is a variable a geometry turbocharger which includes an exhaust turbine 21, an intake compressor 22, a turbo actuator 23, and the like.

The exhaust turbine 21 is housed in a turbine housing 21a and is rotated by an exhaust gas which flows in a exhaust pipe 24. The intake compressor 22 is housed in a compressor housing 22a and is connected with the exhaust turbine 21 through a shaft 25. The intake compressor 22 compresses the air in the intake pipe 26 to supply the air into the engine 11. It is preferable to dispose an intercooler 27, which is indicated by a doted line, downstream of the intake compressor 22 in the intake pipe 26. The intercooler 27 cools the air of which temperature increases. And then, the cooled air is introduced into the engine. A turbo-actuator 23 adjusts angle of a flap 23a to control the pressure of the air.

The EGR apparatus 3 includes an EGR passage 31 and an EGR valve 32. A part of the exhaust gas upstream of the turbo-actuator 23 flows into the intake pipe 26 through the EGR passage 31. It is preferable to dispose an EGR cooler 33, which is indicated by a doted line, in the EGR passage 31. The EGR valve 32 adjusts the amount of exhaust gas which flows into the engine 11.

The intake throttle 4 adjusts amount of fresh air introduced into the engine 11 by adjusting a position of a throttle valve 41 disposed in the intake pipe 26.

The glow plug 5 generates heat when energized through a glow relay 51 to assist the combustion of the fuel.

The swirl control apparatus 6 divides the intake passage into a main passage 61 and a sub passage 62. A swirl valve 63 adjusts opening of the sub passage 62 to control a swirl generating in the combustion chamber.

The ECU 7 controls the operations of the control subjects according to a driving condition of the engine. The ECU 7 receives output signals from an engine speed sensor 71, an angle senor 72 disposed on the camshaft for identifying the injecting cylinder, a temperature sensor 73 for detecting temperature of the fresh air, an air flow sensor 74 for detecting quantity of the fresh air, an air pressure sensor 75 for detecting supercharging pressure downstream of the intake compressor 22, an exhaust gas temperature sensor 76 for detecting temperature of the exhaust gas downstream to the exhaust turbine 21, a pressure difference sensor 78 for detecting pressure difference between the upstream and the downstream of the catalyst 77, a water temperature sensor 79 for detecting a coolant temperature, a rail pressure sensor 81 for detecting pressure in the common-rail 12, a fuel temperature sensor 82 for detecting a temperature of the fuel pressurized by the supply pump 14, an ignition switch 83, a starter switch 84, an accelerator position sensor 85, a clutch sensor 86 for detecting condition of a clutch, a neutral switch 87 and the like.

The ECU 7 comprises a microcomputer which includes a central processing unit (CPU), a memory (ROM, standby RAM, EEPROM, RAM), an input circuit, an output circuit, a power source circuit. In this embodiment, an electric drive unit (EDU: not shown) is accommodated in a case in which the ECU 7 is disposed. The EDU may be independently mounted from the ECU 7.

The ECU 7 performs an injector control and a common-rail pressure control. In the injector control, a current applying timing at which the injector 13 starts to be energized and a current applying duration in which the injector has been energized are calculated. In the common-rail pressure control, an opening degree of the SCV 16 provided on the supply pump 14 is calculated.

(Injector Control)

The ECU 7 includes a fuel mode determining means, a target fuel amount calculation means, and a target injection start timing calculation means. The fuel mode determining means is a control program in which an injection mode (single injection, multi injection) of the injector 13 is determined according to the present driving condition. The target fuel amount calculation means is a control program in which the target fuel amount is calculated based on the driving condition to derive a current applying period to the injector. The target injection start timing calculation means is a control program in which the target injection start timing is calculated based on the driving condition to derive a current apply start timing to the injector.

(Common-Rail Pressure Control)

The ECU 7 includes a basic discharge amount calculation means, a target common-rail pressure calculation means, a discharge amount correction means, and a discharge amount/current value converting means. The basic discharge amount calculation means calculates a basic discharge amount. The target common-rail pressure calculation means calculates a target common-rail pressure. The discharge amount correction means corrects the basic common-rail pressure based on a difference between the calculated target common-rail pressure and an actual common-rail pressure. The discharge amount/current value converting means converts the corrected discharge amount into a driving current value applied to the SCV16.

(Pressure-Chargeing Control)

The ECU 7 includes a target intake pressure calculation means, an intake pressure correction means, and an intake pressure/current value converting means. The target intake pressure calculation means calculates a target intake pressure based on the driving condition. The intake pressure correction means corrects the target intake pressure based on a pressure difference between the calculated target intake pressure and a turbocharging pressure detected by the air pressure senor 75. The intake pressure/current value converting means converts the corrected intake pressure into a driving current value of the actuator 23.

(EGR Apparatus Control)

The ECU 7 includes a target EGR ratio calculation means, an EGR ration correction means, an EGR ratio/current value converting means. The target EGR ration calculation means calculates a target EGR ration based on the driving condition. The EGR ration correction means corrects the target EGR ration based on a difference between a target fresh air amount calculated by a target fresh air and an actual fresh air amount detected by an air flow sensor 74. The EGR ratio/current value converting means converts the corrected EGR ration into a driving current of EGR valve 32.

(Intake Throttle Control)

The ECU 7 includes a target fresh air amount calculation means, a fresh air amount correction means, and a fresh air amount/current value converting means. The target fresh air amount calculation means calculates fresh air amount based on the driving condition. The fresh air amount correction means corrects the target fresh air amount based on a difference between the calculated target air amount and an actual fresh air amount detected by the air flow sensor 74. The fresh air amount/current value converting means converts the corrected fresh air amount into a driving current of the throttle valve 41.

(Swirl Control)

The ECU 7 includes a swirl opening calculation means which performs a feedforward control of opening degree of the swirl valve 63 based on a program stored in the ROM and a sensor signals read in the RAM.

(Feature of the First Embodiment)

The engine 11 performs the diffuse combustion and the premix combustion. In the diffuse combustion, the initial rising inclination of the heat-release-rate is steep (general diesel combustion: first combustion). In the premix combustion, the initial rising inclination of heat-release-rate is gentler than that in the diffuse combustion.

The diffuse combustion is a combustion mode which is suitable to output a high torque, and is performed in a high load condition. The premix combustion such as Homogeneous-charge compression-ignition combustion is a combustion mode which is enable to improve an exhaust characteristic, and is per formed in a low load condition.

In this embodiment, the engine control system is provided with a cylinder pressure sensor 88 which detects pressure in the combustion chamber of the engine 11. The ECU 7 performs a feedback control of the control subjects relating to the engine control based on the detected signal from the cylinder pressure sensor 88.

In this embodiment, the fuel injection start timing by the injector 13 in the common-rail fuel injection apparatus 1 is feedback controlled based on an output signal from the cylinder pressure senor 88.

The ECU 7 includes a feedback control means which performs a feedback control to correct the fuel injection start timing calculated by the target injection start timing calculation means. The feedback control means includes: (a) a heat-release-rate calculation means which calculates the heat-release-rate based on the output signal from the cylinder pressure sensor 88; (b) a combustion mode determining means which determines whether the combustion mode of the engine 11 is the diffuse combustion mode or the premix combustion mode; (c) a first feedback control means which operates in the diffuse combustion mode to derive an ignition timing in which the heat-release-rate exceeds a predetermined ignition determination value $\alpha$, and then feedback controls the injection start timing based on the ignition timing; and (d) a second feedback control means which operates in the premix combustion mode to derive a peak generating timing of the heat-release-rate calculated by the heat-release-rate calculation means, and then feedback controls the injection start timing based on the peak generating timing.

(Combustion Mode Determining Means)

The combustion mode determining means is a program which includes a map to determines whether the combustion mode is a diffuse combustion mode or a premix combustion mode.

Specifically, as shown in graph (a) of FIG. 2, the combustion mode determining means includes the map on which it is determined whether the combustion mode is the diffuse combustion mode or the premix combustion mode according to the engine speed NE and the engine load. When the engine condition is in low load, the combustion mode is determined as the premix combustion mode, and when the engine condition is not in low load, the combustion mode is determined as the diffuse mode.

In the first embodiment, the engine mode is determined based on the engine speed NE and the engine load. Alternatively, the engine combustion mode can be determined based on the EGR ratio, air-fuel ratio, the injection start timing, or the injection pattern as described below.

(1) Based on the EGR Ratio

When the EGR ratio calculated by the target EGR ratio calculation means is greater than a predetermined value, the combustion mode is determined as the premix combustion mode. When the EGR ratio is equal to or less than the predetermined value, the combustion mode is determined as the diffuse combustion.

(2) Based on the Injection Timing

When the injection start timing is retarded relative to a predetermined timing, the combustion mode is determined as the premix combustion. When the injection start timing is advanced relative to the predetermined timing, the combustion mode is determined as the diffuse combustion.

(3) Based on the Injection Pattern

When the injection pattern is the single injection, the combustion mode is determined as the premix combustion. When the multi injection, the combustion mode is determined as the diffuse combustion.

(First Feedback Control Means)

Figure 2A:
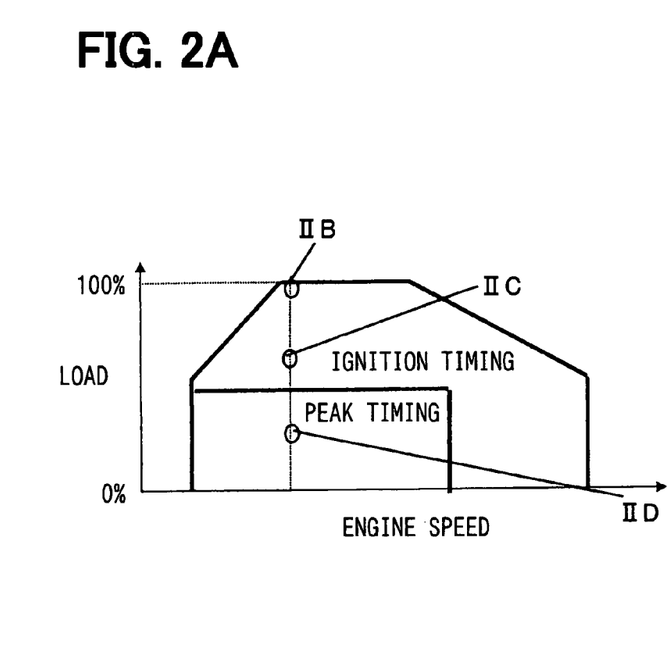
FIG. 2A to 2D are graphs for explaining a diffuse combustion and premix combustion based on an engine speed and an engine load according to a first embodiment.
Figure 2B:
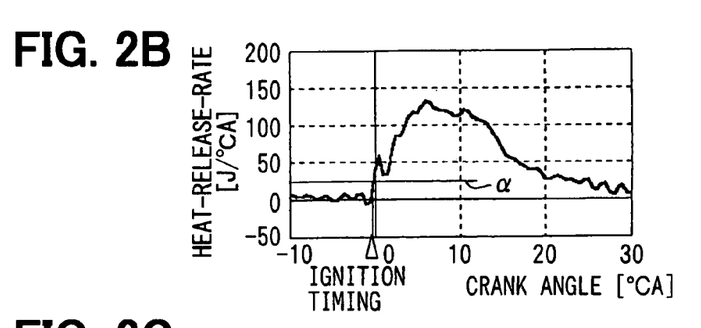
Figure 2C:
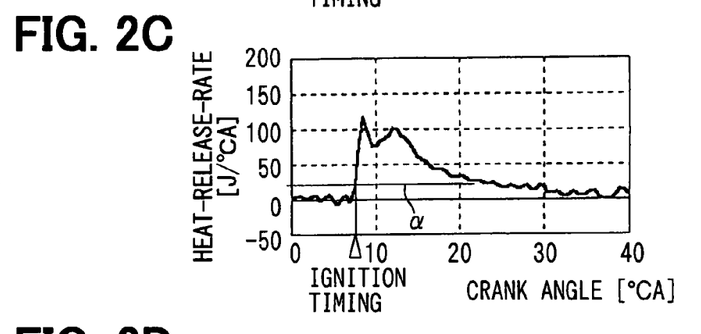
Figure 2D:
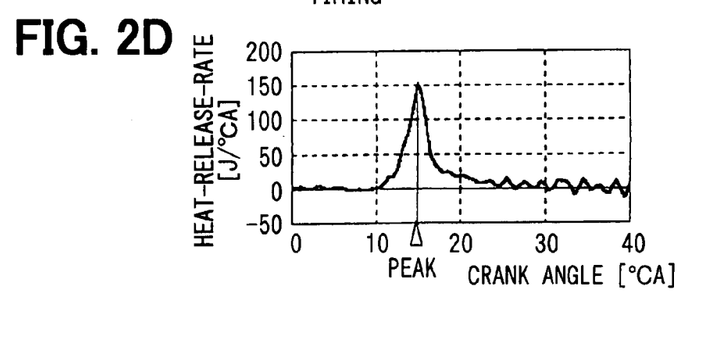

The first feedback control means is a control program in which the ignition timing (crank angle) is calculated and the target injection start timing is feedback corrected. As shown in graphs (b) and (c) in FIG. 2, the heat-release-rate exceeds the ignition determining value $\alpha$ at the ignition timing, and then the target injection start timing is feedback corrected in such a manner as to reduce a time difference between the calculated ignition timing and the target ignition timing by means of PI control or PID control.

The above target ignition timing is calculated based on the map stored in the memory of the ECU 7 or a computing equation.

In this embodiment, a learning function is programmed in which the feedback correction amount is stored as a learning value at the time when the time difference between the detected ignition timing and the target ignition timing is substantially zero, and the target injection start timing is corrected by means of the stored learning value.

(Effect of the First Feedback Control Mean)

As shown in FIG. 11, the output characteristic of the cylinder pressure senor 88 may have the gain deviation and the offset deviation.

However, since the method for detecting the ignition timing by means of the first feedback control means is applied to the diffuse combustion mode, even if the gain deviation or the offset deviation is arose in the output characteristic of the cylinder pressure sensor 88, the initial rising inclination of the heat-release rate is steep, so that the fluctuation of time when the heat-release-rate reaches the ignition determining value $\alpha$ is restricted. Thus, the detecting error of the ignition timing is relatively small, so that the ignition timing is accurately detected to accurately correct the injection start timing by means of the detected ignition timing.

(Premix Combustion)

Figure 3A:
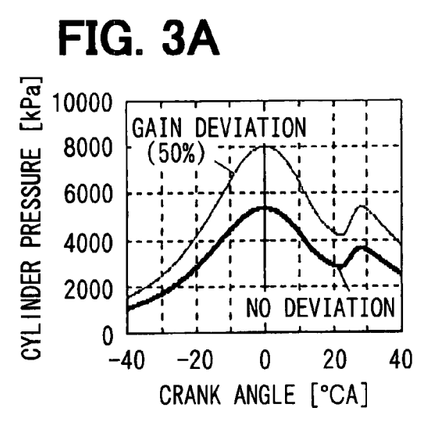
FIGS. 3A to 3D are graphs for explaining a detection error of peak arising timing due to a gain deviation according to the first embodiment.
Figure 3B:
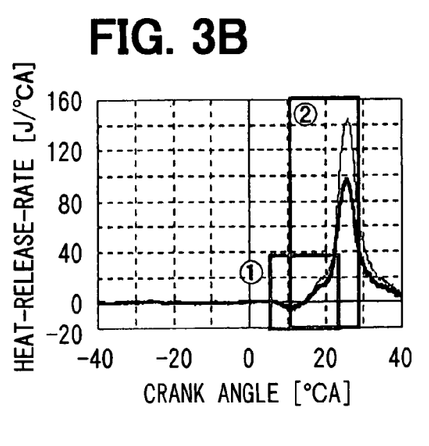
Figure 3C:
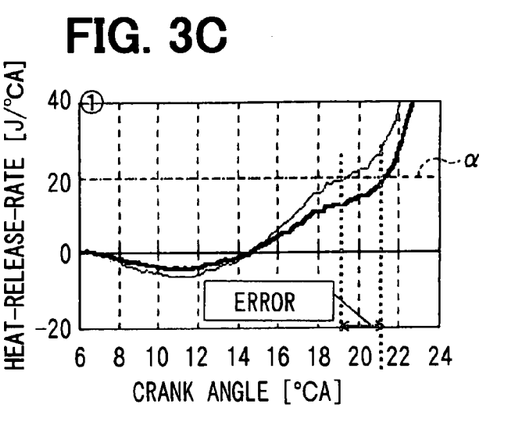
Figure 3D:
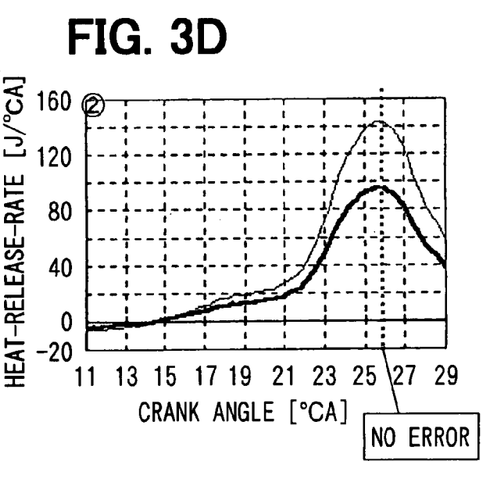
Figure 4A:
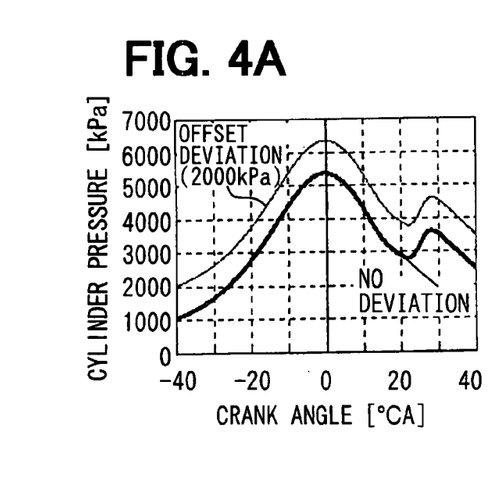
FIGS. 4A to 4D are graphs for explaining a detection error of peak arising timing due to an offset deviation according to the first embodiment.
Figure 4B:
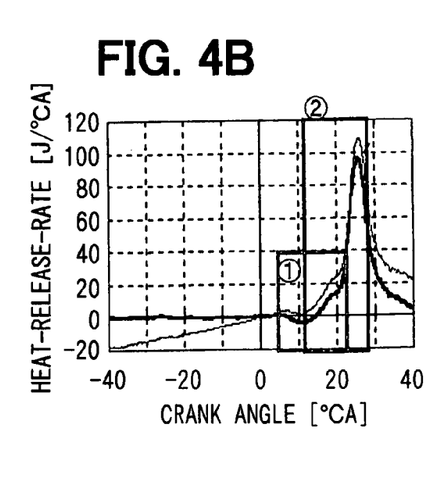
Figure 4C:
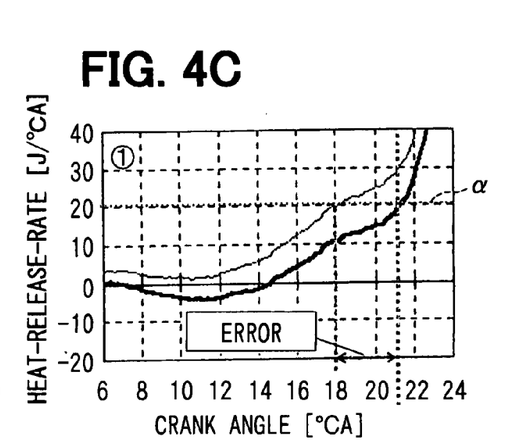
Figure 4D:
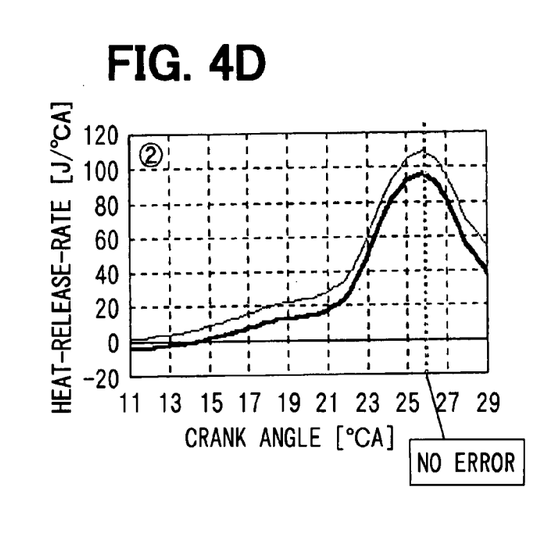

As described above, the initial rising inclination of the heat-release-rate is moderate in the premix combustion. When the gain deviation arises as shown in FIGS. 3B and 3C, or when the offset deviation arises as shown in FIGS. 4B and 4C, the fluctuation of time when the heat-release-rate reaches the ignition determining value $\alpha$ is relatively large, the detecting error of the ignition timing is large. In FIGS. 3A to 3D and 4A to 4D, heavy lines indicate the output characteristic of the cylinder pressure sensor 88 having no gain deviation nor offset deviation. In FIGS. 3A to 3B, thin lines indicate the output characteristic having the gain deviation. In FIGS. 4A to 4B, thin lines indicate the output characteristic having the offset deviation.

Figure 6A:
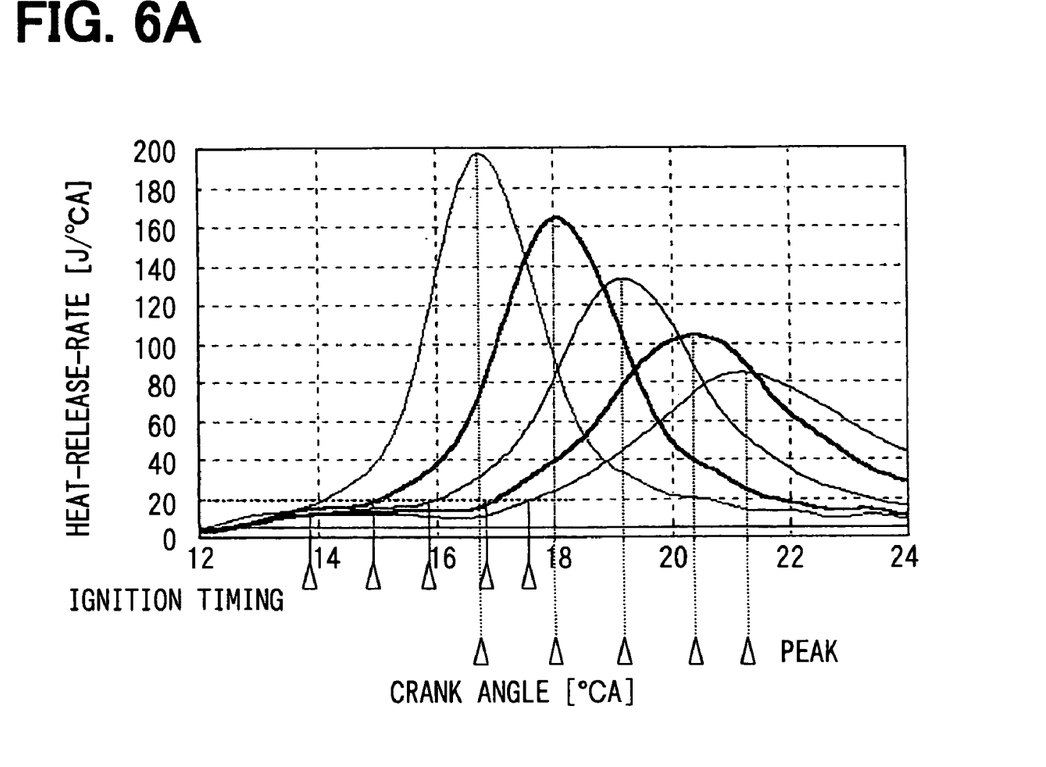
FIGS. 6A and 6B are graphs showing a relationship between a peak arising timing and an ignition timing according to the first embodiment.
Figure 6B:
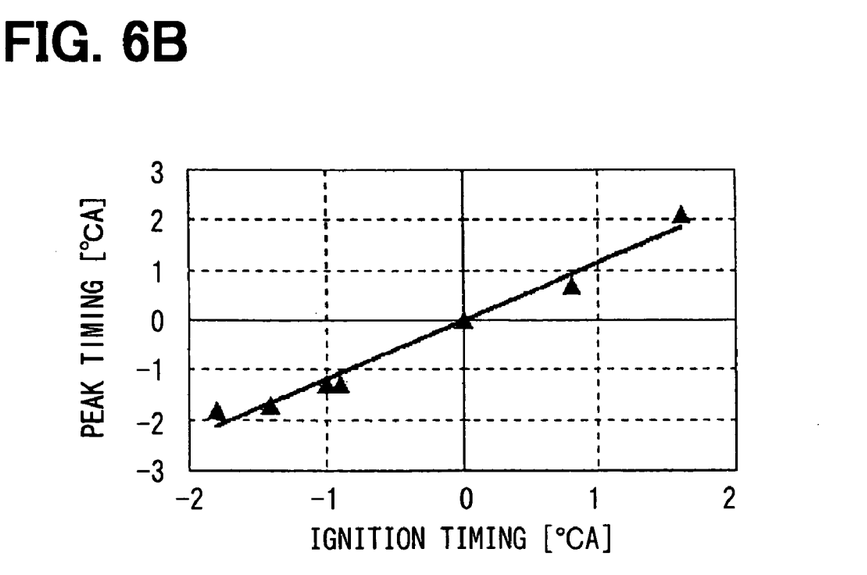

Although the initial rising inclination of the heat-release-ratio is moderate in the premix combustion, one peak of the heat-release-ratio clearly arises as shown in graph (d) in FIG. 2. The timing when the peak arises has a certain relationship with the ignition timing as shown in FIGS. 6A and 6B.

Figure 5A:
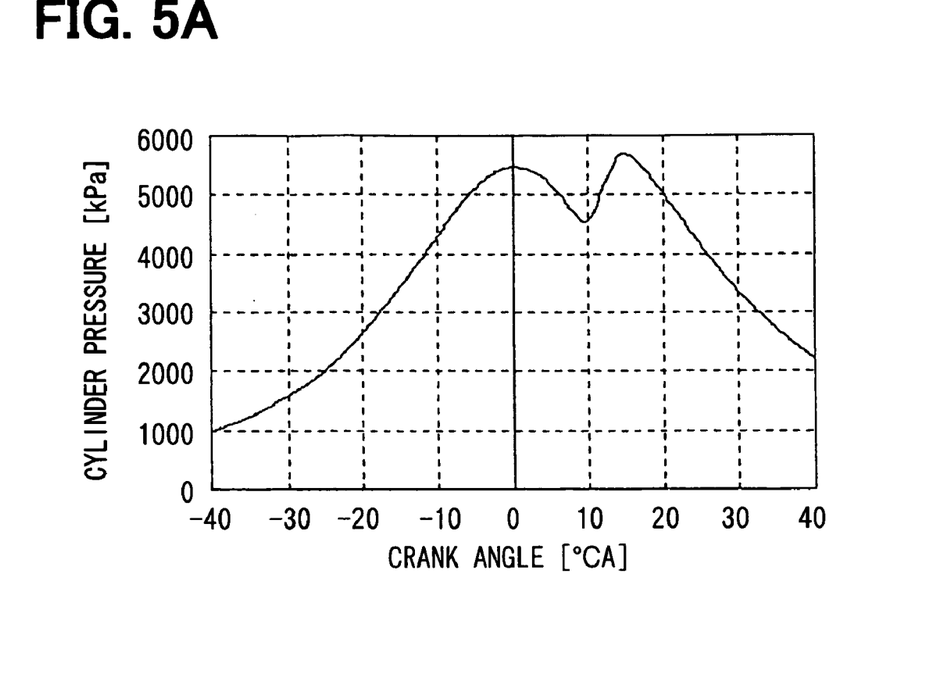
FIGS. 5A and 5B are graphs showing that no clear peak exists in the diffuse combustion according to the first embodiment.
Figure 5B:
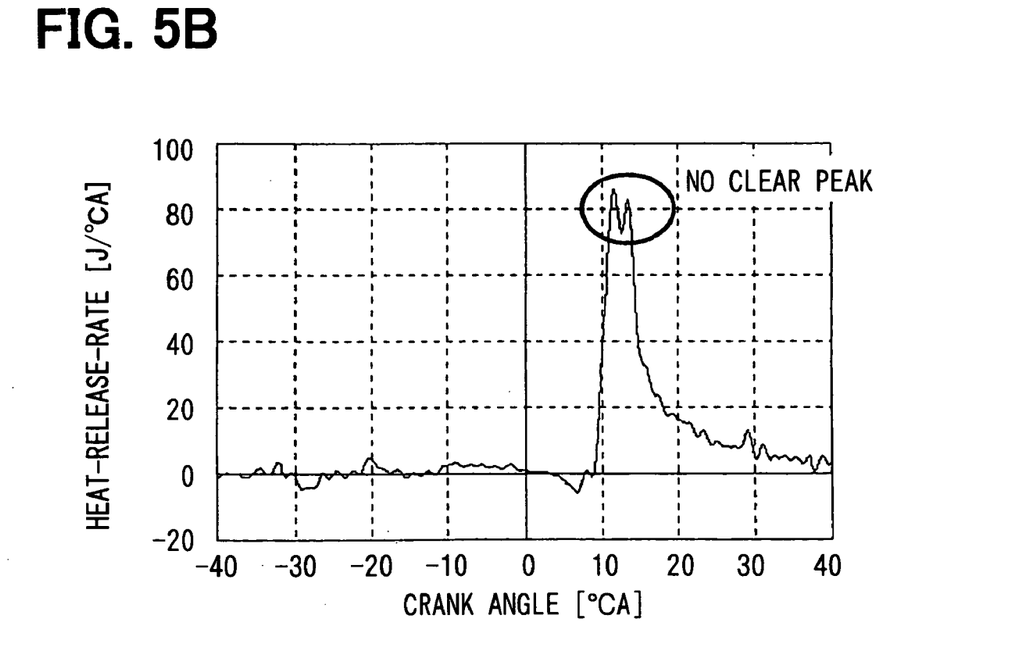

In the diffuse combustion mode, as shown in FIGS. 5A and 5B, there is no clear peak of the heat-release-rate calculated from the cylinder pressure, so that the feedback correction of the control value of the control subject is hardly conducted by means of the peak arising timing.

(Second Feedback Control Means)

The second feedback control means performs a feedback correction of the control value of the control subject by means of the peak arising timing.

The second feedback control means is a control program in which the peak arising timing (crank angle) of the heat-release-rate is calculated, and then, as shown in graphs (d) in FIG. 2, the target injection start timing is feedback corrected in such a manner as to reduce a time difference between the peak arising timing and the target peak arising timing by means of PI control or PID control.

The above target peak arising timing is calculated based on the map stored in the memory of the ECU 7 or a computing equation.

In this embodiment, likely the first feedback control means, a learning function is programmed in which the feedback correction amount is stored as a learning value at the time when the time difference between the detected peak arising timing and the target peak arising timing is substantially zero, and the target injection start timing is corrected by means of the stored learning value.

(Effect of the Second Feedback Control Means)

As described above, the cylinder pressure sensor 88 may have the gain deviation or the offset deviation in its output characteristic. Since the second feedback control means is applied to the premix combustion mode in which one peak of the heat-release-rate clearly exists, there is no detecting error of the peak arising timing even if the gain deviation or the offset deviation arises in the output characteristics of the cylinder pressure sensor 88. Thus, the peak arising timing is accurately detected, so that the injection start timing is accurately corrected.

(Effect of the First Embodiment)

According to the first embodiment, the ignition timing and the peak arising timing is accurately detected based on the output signal of the cylinder pressure senor 88 without high accuracy of the cylinder pressure sensor 88 in both the diffuse combustion mode and the premix combustion mode. Thus, the fuel injection start timing of the injector 13 is accurately feedback controlled based on the detected ignition timing or the peak arising timing.

[Second Embodiment]

Figure 7A:
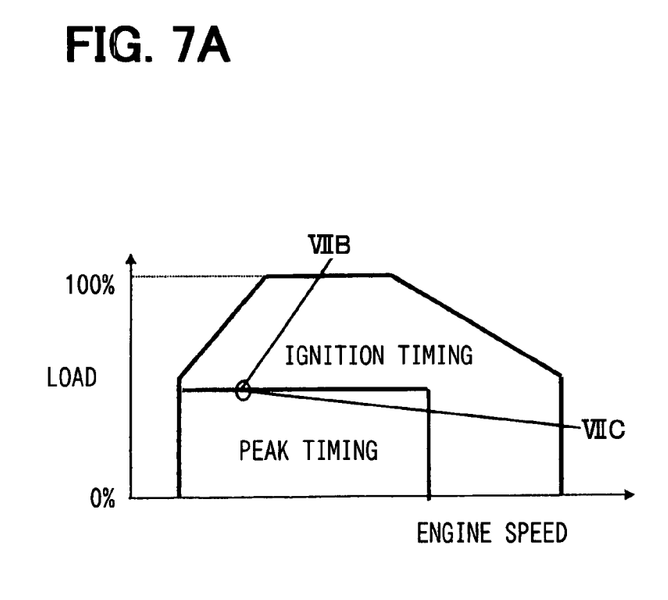
FIG. 7A to 7C are graphs for explaining that the diffuse combustion and the premix combustion exist in a same driving condition according to a second embodiment.
Figure 7B:
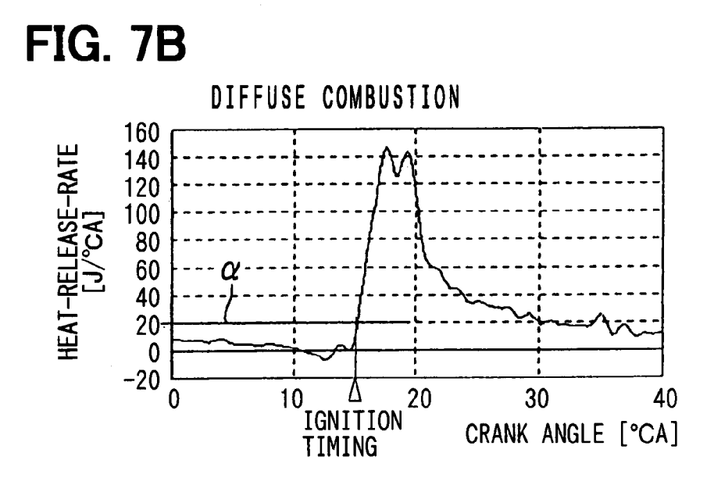
Figure 7C:
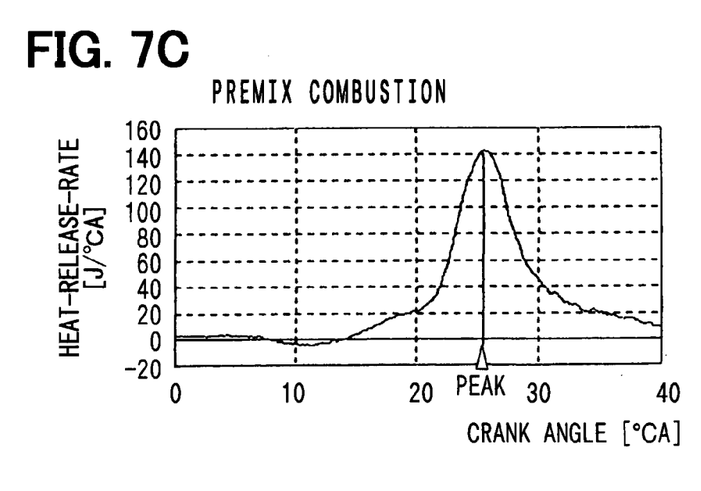

Referring to FIG. 7, a second embodiment is described hereinafter.

The combustion mode determining means in the first embodiment determines whether the combustion mode is the diffuse combustion or the premix combustion based on the engine speed and the engine load. Even in the same engine driving condition (such as the engine speed or the engine load), the combustion mode may be changed to change the heat-release-rate due to a delay of air during transitional period.

According to the second embodiment, a graphic calculation means is provided. The graphic calculation means computes a graphic form or a graphic area of the heatrelease-rate, on which it is determined whether the combustion mode of the engine 11 is the diffuse combustion mode or the premix combustion mode.

Specifically, the whole of the graphic form may be identified by the well-known pattern recognition technique, or a part of the graphic form in which the heat-release-rate is higher than a predetermined value may be identified by the pattern recognition technique. Alternatively, based on an area of the graphic form in which the heat-release-rate is higher than a predetermined value, it may be determined whether the combustion mode is the diffuse combustion mode or the premix combustion mode.

A graph (b) in FIG. 7 shows a variation of the heat-release-rate in the diffuse combustion mode, and a graph (c) shows the same in the premix combustion mode.

The combustion mode determining means in the second embodiment can be combined with the combustion mode determining means in the first embodiment in order to enhance the accuracy of determination.

[Third Embodiment]

Figure 8:
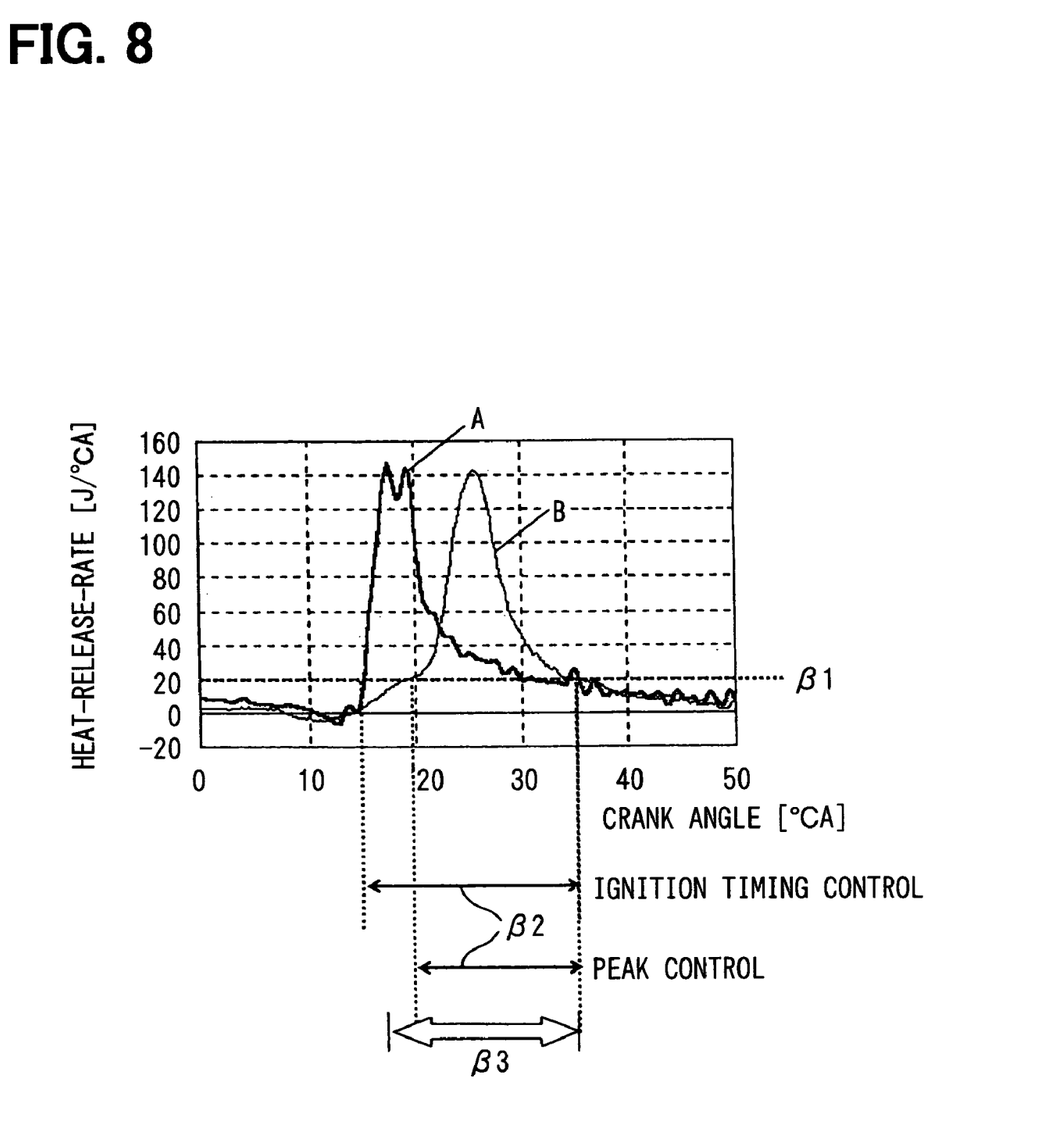
FIG. 8 is a graph for determining whether a combustion mode is a diffuse combustion mode or a premix combustion mode according to a third embodiment.

Referring to FIG. 8, a third embodiment is described hereinafter.

The combustion mode determining means in the third embodiment determines whether the combustion mode of the engine 11 is the diffuse combustion mode or the premix combustion mode based on a predetermined period $\beta 2$ in which the heat-release-rate exceeds a predetermined threshold $\beta 1$. The threshold $\beta 1$ may be the same value as the ignition determining value $\alpha$.

Specifically, as shown in FIG. 8, when the predetermined period $\beta 2$ is longer than a determining period $\beta 3$ ($\beta 2 > \beta 3$), it is determined that the combustion mode is the diffuse combustion mode. When the predetermined period $\beta 2$ is less than or equal to the determining period $\beta 3$ (($\beta 2 \leq \beta 3$), it is determined that the combustion mode is the premix combustion mode.

In FIG. 8, a heavy line A represents the heat-release-ratio in the diffuse combustion mode, and a thin line B represents the heat-release-rate in the premix combustion mode.

[Fourth Embodiment]

Figure 9A:
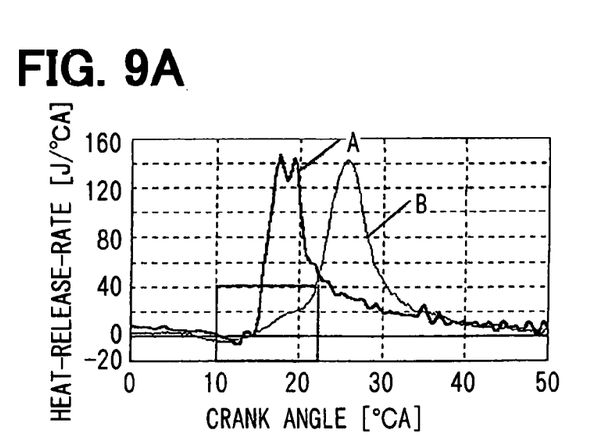
FIGS. 9A to 9C are graphs for determining whether a combustion mode is a diffuse combustion mode or a premix combustion mode based on a variation amount and variation period of a heat-release-rate according to a fourth embodiment.
Figure 9B:
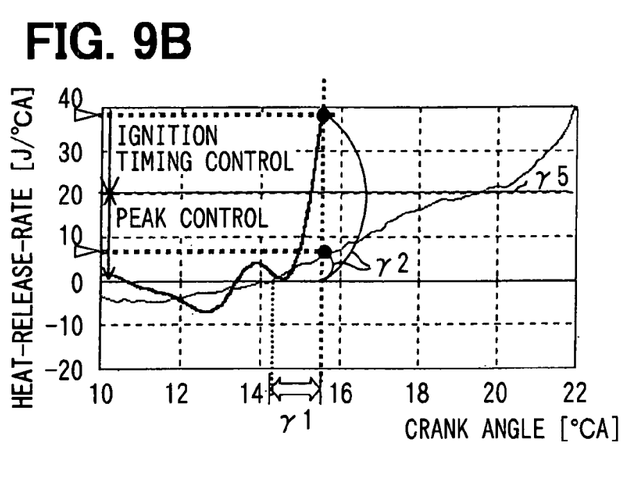
Figure 9C:
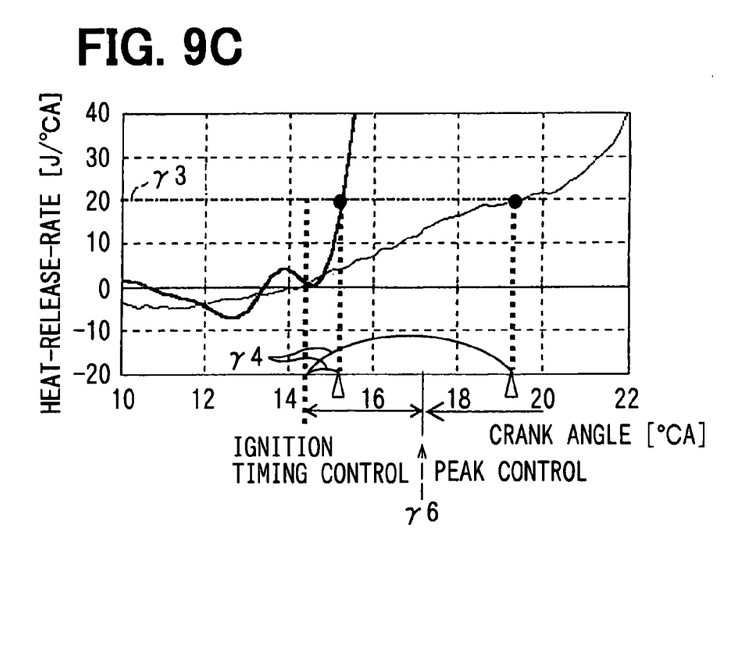

Referring to FIG. 9, a fourth embodiment is described hereinafter.

The combustion determining means in the fourth embodiment determines whether the combustion mode is the diffuse combustion mode or the premix combustion mode based on a variation amount $\gamma 2$ of the heat-release-rate during a predetermined determining period $\gamma 1$ or a variation period $\gamma 4$ in which the heat-release-rate reaches the predetermined determining value $\gamma 3$.

Specifically, as shown in a graph (b) in FIG. 9, when a variation amount $\gamma 2$ is greater than a threshold $\gamma 5$ ($\gamma 2 > \gamma 5$), it is determined that the combustion mode is the diffuse mode, and when the variation amount $\gamma 2$ is less than or equal to the threshold $\gamma 5$ ($\gamma 2 \leq \gamma 5$), it is determined the combustion mode is the premix combustion mode.

Alternatively, as shown in a graph (c) in FIG. 9, a variation period $\gamma 4$ in which the heat-release-rate reaches a predetermined determining value $\gamma 3$ from a certain value is shorter than a predetermined threshold $\gamma 6$ ($\gamma 4 < \gamma 6$), it is determined the combustion mode is the diffuse combustion mode. When the variation period $\gamma 4$ longer than or equal to the threshold $\gamma 6$ ($\gamma 4 \geq \gamma 6$), it is determined that the combustion mode is premix combustion mode.

In FIG. 9, heavy lines A indicate the heat-release-ratio in the diffuse combustion mode, and thin lines B indicate the heat-release-ratio in the premix combustion.

[Fifth Embodiment]

Figure 10:
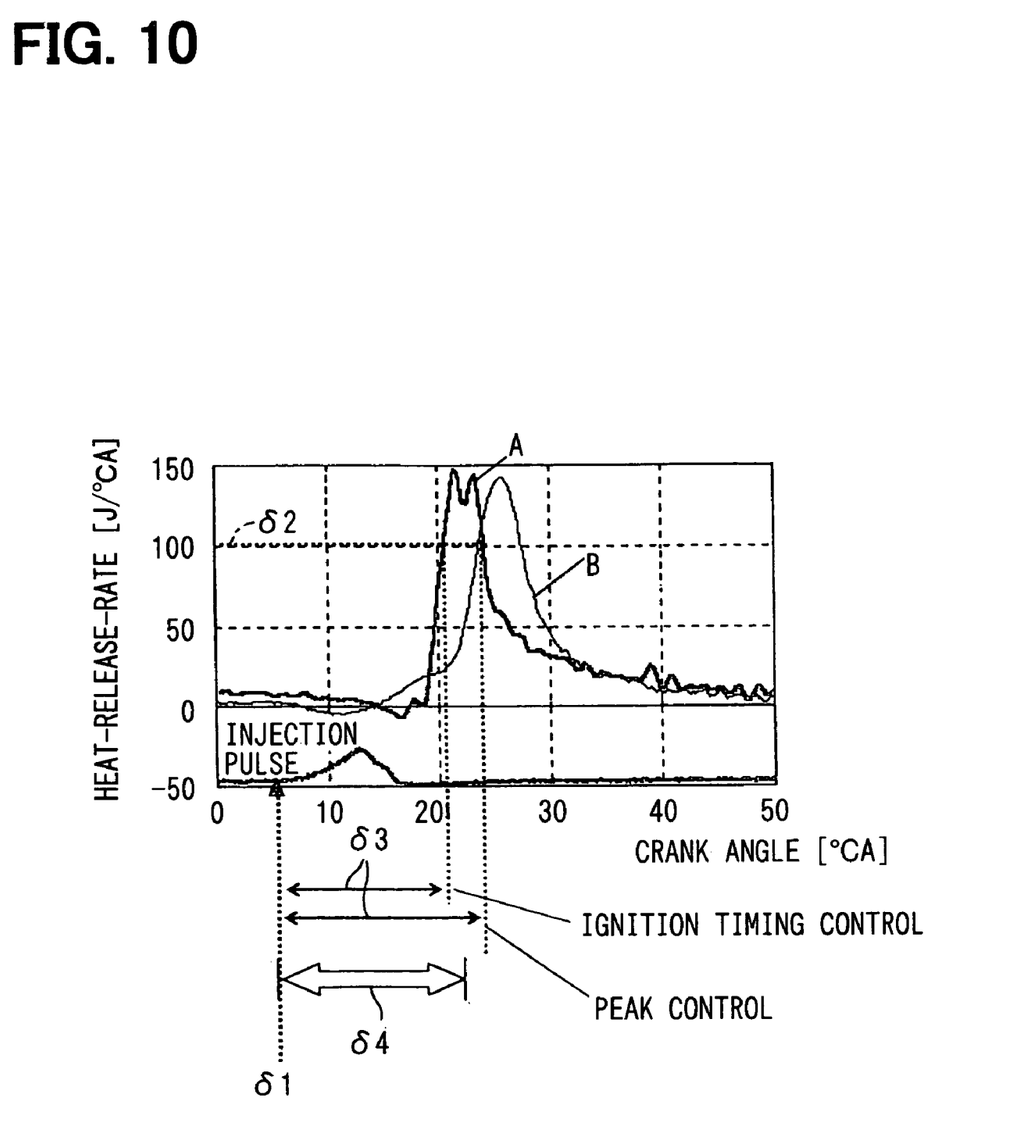
FIG. 10 is a graph for determining whether a combustion mod is a diffuse combustion mode or a premix combustion mode according to a fifth embodiment.

Referring to FIG. 10, a fifth embodiment is described hereinafter.

The combustion mode determining means in the fifth embodiment determines whether the combustion mode is the diffuse combustion mode or the premix combustion mode based on a predetermine determining period $\delta 3$ in which the heat-release-rate reaches the predetermined value $\delta 2$ from an injection start timing $\delta 1$.

Specifically, as shown in FIG. 10, when the predetermine period $\delta 3$ is shorter than a threshold $\delta 4$ ($\delta 3 > \delta 4$), it is determined that the combustion mode is the diffuse combustion mode, and when the period $\delta 3$ is longer than or equal to the threshold $\delta 4$ ($\delta 3 \geq \delta 4$), it is determined that the combustion mode is premix combustion mode.

In FIG. 10, a heavy line A indicates the heat-release-rate in the diffuse combustion mode, a thin line B indicates the heat-release-rate in the premix combustion mode.

[Modification]

In the above embodiments, the present invention is applied to the feedback control of the injection start timing of the injector 13. The present invention can be applied to the feedback control of the injection amount of the injector 13.

The turbo opening degree of the supercharger apparatus 2, the valve opening degree of the EGR apparatus 3, and the valve opening degree of the intake throttle apparatus 4 can be feedback controlled in such a manner that the detected ignition timing and the peak arising period of the heat-release-rate become the predetermined values.

In the above embodiment, the common-rail type fuel injection apparatus 1 includes a two-way type injector 13 driven by the electromagnetic valve 15. Alternatively, the common-rail type fuel injection apparatus may include an injector which is directly driven by an actuator, or a three-way injector.

The present invention can be applied to a fuel injection apparatus for a diesel engine having no common-rail, or a fuel injection apparatus foe a gasoline engine.

What is claimed is:

1. An engine control system comprising:
   a cylinder pressure sensor detecting pressure in a combustion chamber of an engine; and
   an electronic control unit feedback-controlling a control subject which relates to an engine control based on a detected value by the cylinder pressure sensor, wherein the electronic control unit includes:
   a heat-release-rate calculation means for calculating a heat-release-rate in the combustion chamber of the engine based on an output signal from the cylinder pressure sensor;
   a combustion mode determining means for determining whether a combustion mode of the engine is a first combustion mode or a second combustion mode in which a initial rising inclination of the heat-release-rate relative to a time axis or a crank angle is more moderate than that in the first combustion mode;
   a first feedback control means activated when the combustion mode is the first combustion mode, the first feedback control means deriving an ignition timing in which the calculated heat-release-rate exceeds a predetermined ignition determining value, the first feedback control means feedback-controlling the control subject based on the ignition timing; and a second feedback control means activated when the combustion mode is the second combustion mode, the second feedback control means deriving a peak arising timing of the calculated heat-release-rate, the second feedback control means feedback-controlling the control subject based on the peak arising timing.

2. The engine control system according to claim 1, wherein the combustion mode determining means includes a map for determining whether the combustion mode is the first combustion mode or the second combustion mode, and the combustion mode is determined whether the first combustion mode or the second combustion mode based on a driving condition of the engine and the map.

3. The engine control system according to claim 1, wherein the combustion mode determining means includes a graphic form calculation means for calculating a graphic form of the heat-release-rate relative to the time axis or the crank angle, and the combustion mode is determined whether the first combustion mode or the second combustion mode based on a graphic form or a graphic area of the heat-release-rate.

4. The engine control system according to claim 1, wherein the combustion mode determining means determines whether the engine combustion mode is first combustion mode or the second combustion mode based on a period in which the heat-release-rate exceeds a predetermined threshold.

5. The engine control system according to claim 1, wherein the combustion mode determining means determines whether the engine combustion mode is first combustion mode or the second combustion mode based on a variation amount of the heat-release-rate in a predetermined period or a change period in which the heat-release-rate reaches a predetermined value.

6. The engine control system according to claim 1, wherein the combustion mode determining means determines whether the engine combustion mode is first combustion mode or the second combustion mode based on a predetermined period in which the heat-release-rate reaches a predetermined value from an fuel injection start timing.

7. The engine control system according to claim 1, wherein the control subject is at least one of a fuel injection apparatus, an EGR apparatus, an intake throttle, and a supercharger apparatus, and the first and the second feedback control means feedback-control a control value of the control subject based on the ignition timing or the peak arising timing.

8. The engine control system according to claim 7, wherein the control subject is a fuel injection apparatus, and the first and the second feedback control means feedback-control a fuel injection start timing into a target injection start timing based on the ignition timing or the peak arising timing.

* * * * *